United States Patent
MacGougan et al.

(10) Patent No.: US 9,681,269 B2
(45) Date of Patent: Jun. 13, 2017

(54) POSITIONING ACCURACY USING 3D BUILDING MODELS

(71) Applicant: APPLE INC., Cupertino, CA (US)

(72) Inventors: Glenn D. MacGougan, San Jose, CA (US); Robert W. Mayor, Half Moon Bay, CA (US); Kumar Chhokra, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/209,703

(22) Filed: Jul. 13, 2016

(65) Prior Publication Data

US 2017/0013407 A1 Jan. 12, 2017

Related U.S. Application Data

(63) Continuation of application No. 14/503,046, filed on Sep. 30, 2014, now Pat. No. 9,408,175.

(60) Provisional application No. 61/988,027, filed on May 2, 2014.

(51) Int. Cl.
| | |
|---|---|
| *H04W 4/02* | (2009.01) |
| *H04W 64/00* | (2009.01) |
| *H04B 17/40* | (2015.01) |
| *H04W 4/20* | (2009.01) |

(Continued)

(52) U.S. Cl.
CPC ............ *H04W 4/025* (2013.01); *G01S 19/28* (2013.01); *H04B 7/18519* (2013.01); *H04B 17/40* (2015.01); *H04W 4/023* (2013.01); *H04W 4/20* (2013.01); *H04W 64/00* (2013.01); *H04W 4/02* (2013.01)

(58) Field of Classification Search
CPC ....... H04W 4/025; H04W 4/20; H04W 64/00; H04W 4/023; H04W 4/02; H04B 7/18519; H04B 17/40; G01S 19/28
See application file for complete search history.

(56) References Cited

U.S. PATENT DOCUMENTS

| | | | |
|---|---|---|---|
| 6,590,530 | B2 | 7/2003 | van Diggelen et al. |
| 6,640,189 | B2 | 10/2003 | Perlmutter et al. |

(Continued)

OTHER PUBLICATIONS

Notice of Allowance for U.S. Appl. No. 14/503,046 mailed Mar. 28, 2016, 12 pages.

(Continued)

*Primary Examiner* — Chuong A Ngo
(74) *Attorney, Agent, or Firm* — Kilpatrick Townsend & Stockton LLP

(57) ABSTRACT

A mobile device adjusts the extents to which it depends on various satellites to estimate its global position based on the predicted probability for each such satellite that a ray extending from that satellite to the mobile device is obstructed by a building. The mobile device can predict the probabilities of building obstructions based on a digital model of the environment in which the mobile device is estimated to be. The mobile device weights the extent of uncertainty for each satellite's global positioning data based on the predicted probability of obstruction for that satellite. Using these weighted uncertainties, the mobile device selects the extents to which it relies on each satellite's global positioning data when estimating the mobile device's current global position.

21 Claims, 6 Drawing Sheets

(51) Int. Cl.
*G01S 19/28* (2010.01)
*H04B 7/185* (2006.01)

(56) References Cited

U.S. PATENT DOCUMENTS

| | | | |
|---|---|---|---|
| 7,907,088 B2* | 3/2011 | Terashima | G01S 19/22 |
| | | | 342/357.61 |
| 9,125,019 B1* | 9/2015 | Heikkila | H04W 4/023 |
| 2009/0210156 A1 | 8/2009 | Riley et al. | |
| 2013/0095849 A1* | 4/2013 | Pakzad | H04W 64/00 |
| | | | 455/456.1 |

OTHER PUBLICATIONS

Supplemental Notice of Allowance for U.S. Appl. No. 14/503,046 mailed Jun. 13, 2016, 2 pages.

* cited by examiner

POSITIONING ACCURACY USING 3D BUILDING MODELS

CROSS REFERENCE TO RELATED APPLICATIONS

This continuation application claims the benefit and priority of U.S. Non-Provisional application Ser. No. 14/503,046, filed Sep. 30, 2014, entitled "IMPROVED POSITIONING ACCURACY USING 3D BUILDING MODELS", now allowed, and U.S. Provisional Application Ser. No. 61/988,027, filed May 2, 2014, entitled "IMPROVED POSITIONING ACCURACY USING 3D BUILDING MODELS", which are incorporated herein by reference in their entirety.

BACKGROUND

Techniques disclosed herein pertain generally to the field of global positioning systems, and more specifically to techniques for improving the accuracy of mobile device location estimation using satellite signals. Mobile devices, such as smart phones, typically come equipped with global positioning systems that enable those devices to estimate their geographical coordinates based on signals received from various satellites. A mobile device can compute the position of a Global Navigation Satellite System (GNSS) satellite using satellite ephemeris information and a time estimate. A mobile device also can compute an azimuth and elevation of such a satellite for a particular combination of latitude, longitude, and altitude. Given a position, velocity, and time (PVT) for each GNSS satellite from which it receives a signal, a mobile device can estimate distances between each satellite and the mobile device. A pseudorange is the pseudo distance between a satellite and GPS receiver. To determine its position, a mobile device can determine the ranges to multiple satellites. For each satellite, the pseudoranges for that satellite can be obtained by multiplying the speed of light by the time the signal has taken to travel from that satellite to the mobile device. The term pseudoranges is used to refer to such distances because there the time measured might be inaccurate. The mobile device can use such distances, or pseudoranges, to estimate its own position on or near the Earth's surface with greater accuracy.

However, in an urban environment in which tall buildings surround a mobile device, the signals that the mobile device detects from various satellites might not be direct line-of-sight signals. In such an environment, at least some of the signals that the mobile device detects might actually be signals that have reflected off of building surfaces. This reflection can distort the mobile device's estimation of each satellite's distance from the mobile device. As a result, the mobile device might estimate its geographical coordinates with less accuracy than if the detected signals had not been reflected in this manner.

BRIEF SUMMARY

According to techniques disclosed herein, a mobile device adjusts the extents to which it depends on various satellites to estimate its global position based on the predicted probability for each such satellite that a ray extending from that satellite to the mobile device is obstructed by a building. The mobile device can predict the probabilities of building obstructions based on a digital three-dimensional (3D) model of the environment in which the mobile device is estimated to be. The mobile device weights the extent of uncertainty for each satellite's pseudorange measurements based on the predicted probability of obstruction for that satellite.

Using these weighted uncertainties, the mobile device selects the extents to which it relies on each satellite's global positioning data when estimating the mobile device's current global position.

DETAILED DESCRIPTION

Using techniques disclosed herein, a mobile device such as a smart phone can use a digital 3D model of the environment in which the mobile device is generally predicted to be in order to determine which lines-of-sight from various satellites are likely to be obstructed by buildings or other objects in that environment.

Determining Occluded Signals Using a Digital 3D Model

Figure 1:
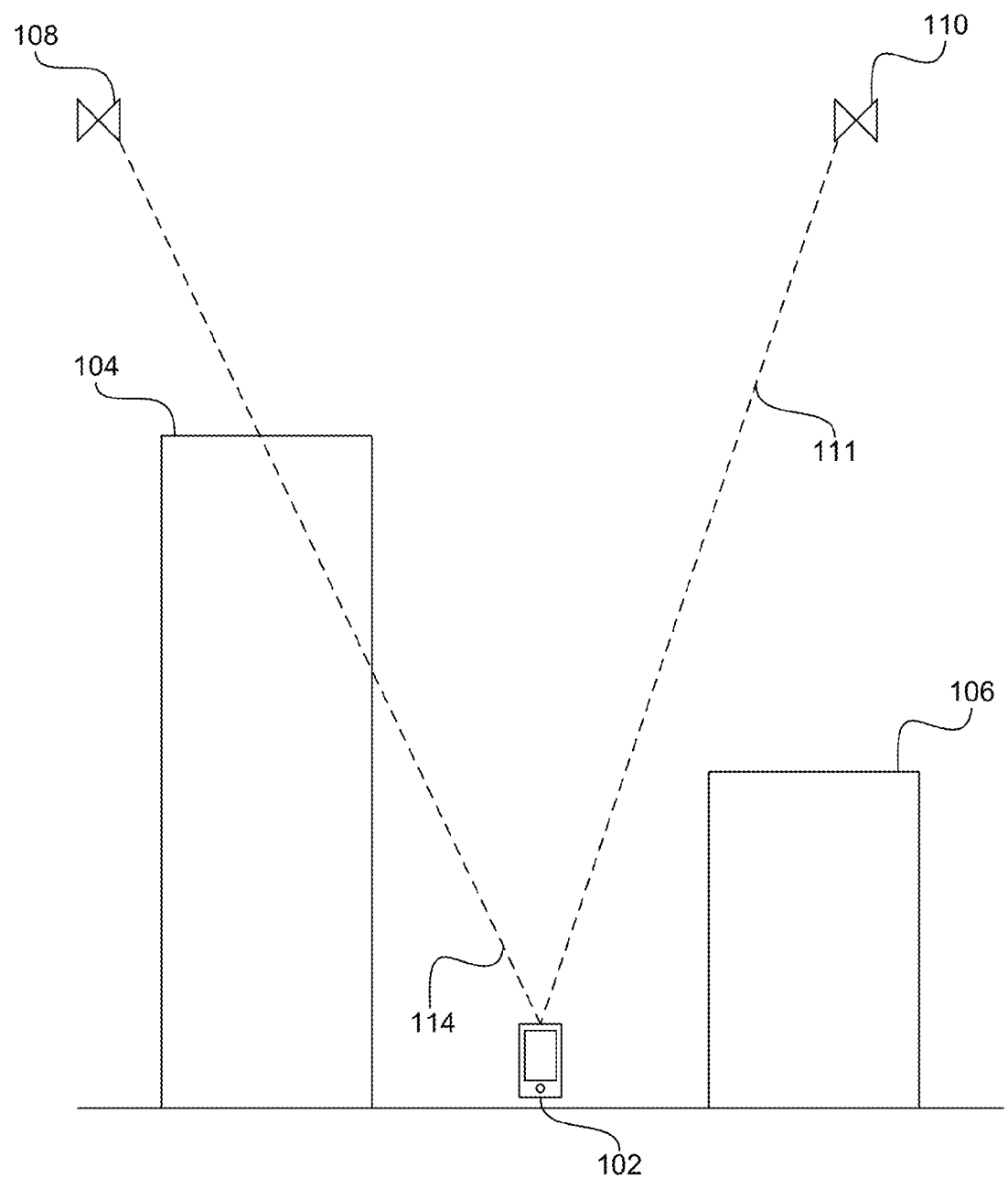
FIG. 1 is a diagram that illustrates a mobile device in an urban environment where some direct line-of-sight signals from some satellites may be obstructed by buildings or other objects.

FIG. 1 is a diagram that illustrates a mobile device in an urban environment where some direct line-of-sight signals from some satellites may be obstructed by buildings or other objects. As shown in FIG. 1, a mobile device 102 is actually located at ground-level on a street in between two buildings 104 and 106. However, although mobile device 102 might possess information that places mobile device 102 somewhere in the vicinity of buildings 104 and 106, mobile device 102 might not be able to estimate its position with high accuracy without relying on signals that mobile device 102 receives from one or more satellites. Because mobile device 102 can already possess some rough notion of the environment in which it is generally located, mobile device 102 can request, from a remote server, over one or more wireless networks, a digital 3D model of that environment.

Such a model might include wire frame objects representing buildings, trees, and other relatively permanent structures, for example. Thus, such a model can represent the dimensions and geographical coordinates of the objects in the environment. The model might encompass a 3D region having a specified volume. For example, the model might be a section of a grid occupying a specified quantity of cubic meters on a master map. Using the model, mobile device 102 can determine heights of all of the buildings in the vicinity of the area in which mobile device 102 is roughly estimated to be.

As shown in FIG. 1, two satellites 108 and 110 actually orbit somewhere overhead of mobile device 102. A direct line-of-sight ray traced from satellite 108 to mobile device 102 is actually obstructed by building 104. Therefore, a signal that mobile device 102 might detect from satellite 108 is highly likely to be a reflected signal rather than a direct line-of-sight signal. For example, if mobile device 102 detects a signal from satellite 108, then it is highly likely that mobile device 102 is detecting that signal after that signal has reflected off of one of the surfaces of building 106 or some other object.

If mobile device 102 possesses information suggesting that a detected signal from satellite 108 is highly likely to be reflected, then mobile device 102 can responsively reduce its reliance upon that detected signal for purposes of estimating its actual position. In contrast, a direct line-of-sight ray traced from satellite 110 to mobile device 102 is not obstructed by building 104, building 106, or any other known object. Therefore, a signal that mobile device 102 detects from satellite 110 is highly likely to be a direct light-of-sight signal, unreflected off of any surface. If mobile device 102 possesses information suggesting that a detected signal from satellite 110 is highly likely to be a direct line-of-sight signal, then mobile device 102 can responsively increase its reliance upon that detected signal for purposes of estimating its actual position.

According to embodiments, mobile device 102 can use the information in the digital 3D model in order to estimate probabilities that buildings or other objects actually obstruct direct lines-of-sight between satellites (e.g., satellites 108 and 110) from which mobile device 102 has detected signals and mobile device 102. The estimations are probabilities because the exact geographical coordinates of mobile device 102 might not be known with high precision. Additionally, the estimations are probabilities because the information in the digital 3D model potentially might be inaccurate. Mobile device 102 initially might approximate its geographical position based on WiFi or cellular telephone signals that mobile device 102 detects. Based on such an approximation, mobile device 102 can estimate a region within the digital 3D model in which mobile device 102 possibly could be. Mobile device 102 can then use the techniques disclosed herein to refine its position based on various detected satellite signals and the obstruction probabilities that mobile device 102 can calculate based on the digital 3D model.

Figure 6:
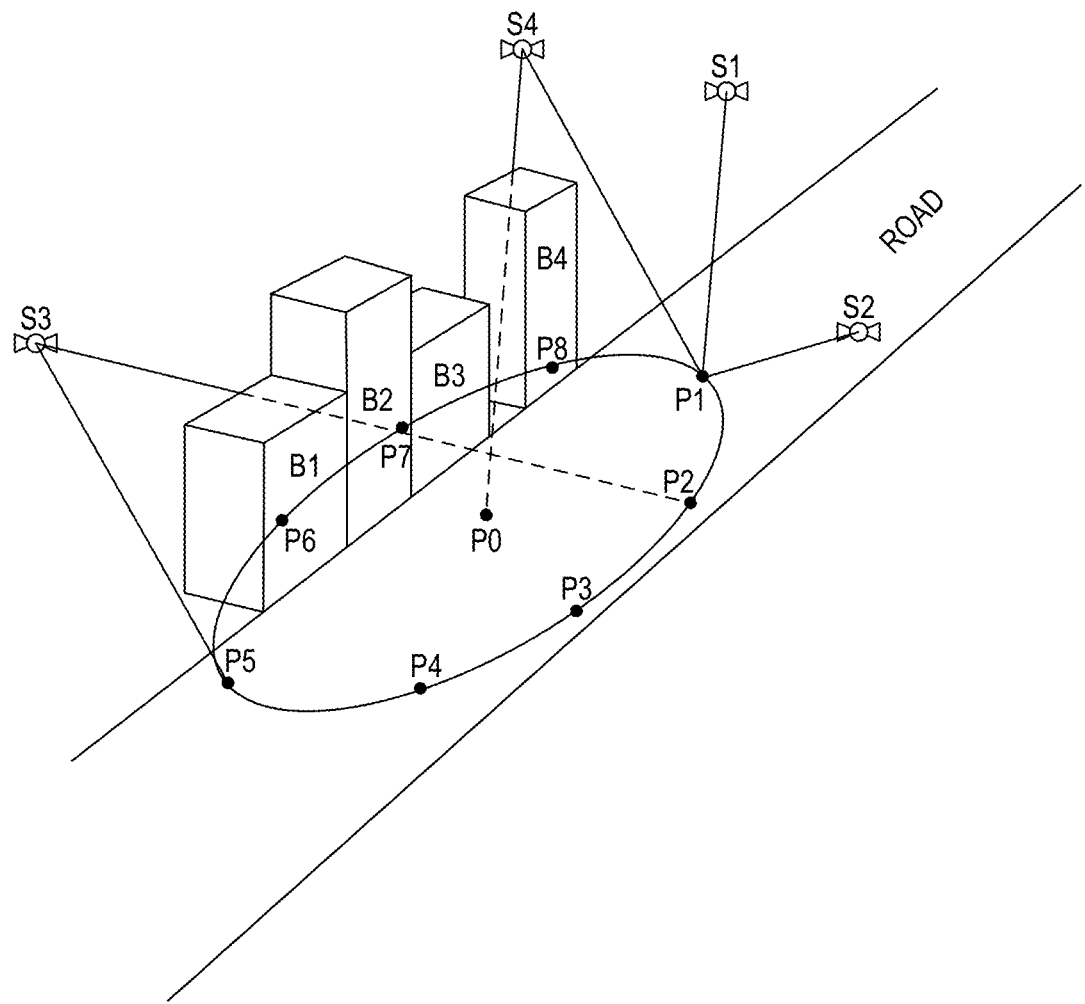
FIG. 6 is a diagram that illustrates how signals from various satellites to various sampling points within a region can be occluded by buildings that are represented within a digital 3D model, according to an embodiment of the invention.

FIG. 6 is a diagram that illustrates how signals from various satellites to various sampling points within a region can be occluded by buildings that are represented within a digital 3D model, according to an embodiment of the invention. As shown in FIG. 6, a sampling point P0 is at the center of an elliptical region in which mobile device 102 is roughly estimated to be. Sampling points P1-P8 surround sampling point P0 along the boundary of the elliptical region. Four buildings B1-B4 are represented within a digital 3D model within and around the region. Four satellites S1-S4 have known PVT values. As can be seen, some signals from some of satellites S1-S4 to some of sampling points P0-P8 are occluded by some of buildings B1-B4.

Specifically, in FIG. 6, a signal from satellite S3 to sampling point P2 is occluded by building B1. Similarly, a signal from satellite S4 to sampling point P0 is occluded by building B4. Some of the sampling points can be eliminated from consideration as eligible potential positions at which mobile device 102 is actually located, because those sampling points are located inside of some of the buildings represented within the digital 3D model. Specifically, in FIG. 6, sampling points P6, P7, and P8 are located within buildings B1, B2, and B4, respectively.

Weighting Uncertainty Measurements

Figure 2:
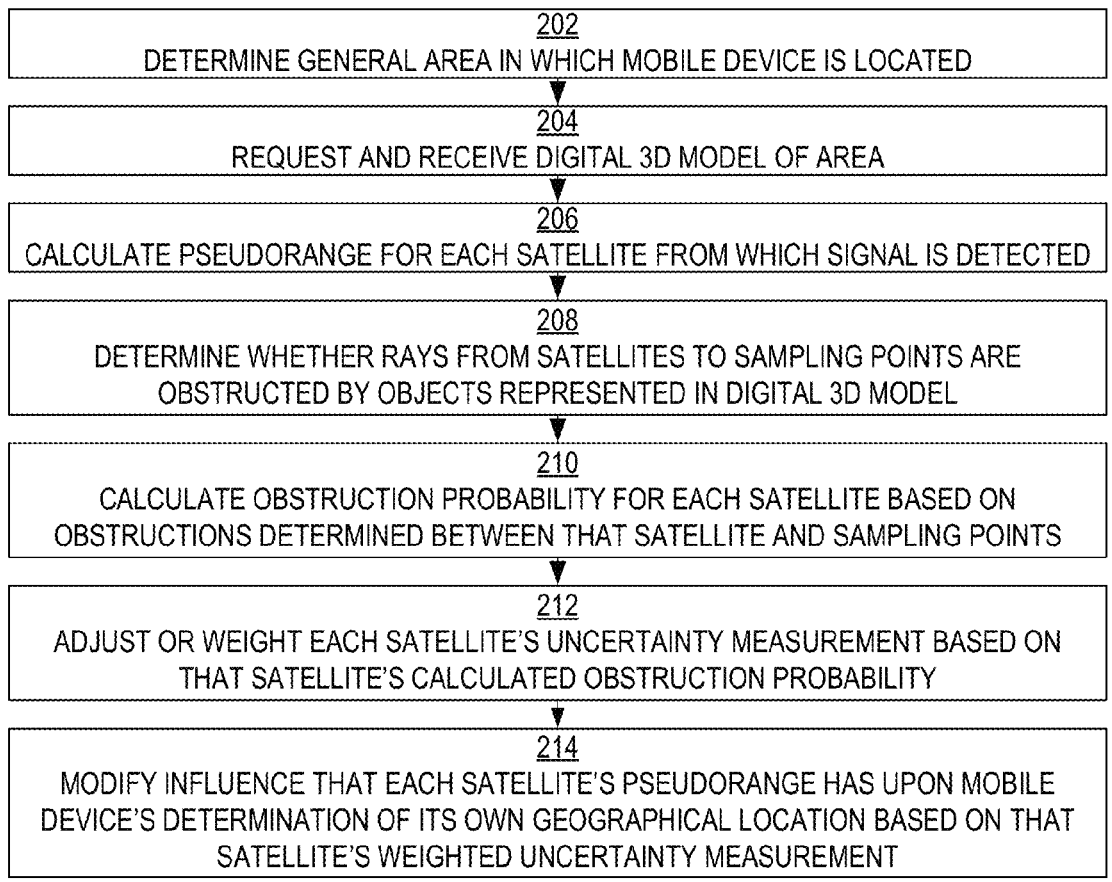
FIG. 2 is a flow diagram that illustrates a technique by which a mobile device can weight uncertainty measurements for various satellite signals based on likelihoods that those signals are obstructed by objects represented within a digital model of an environment in which the mobile device is generally located, according to an embodiment of the invention.

FIG. 2 is a flow diagram that illustrates a technique by which a mobile device can weight uncertainty measurements for various satellite signals based on likelihoods that those signals are obstructed by objects represented within a digital model of an environment in which the mobile device is generally located, according to an embodiment of the invention. The mobile device can use the weighted uncertainty measurements to adjust the predicted accuracy of the pseudorange measurement for each satellite that the mobile device can detect. In estimating its own position, the mobile device can adjust the extent to which the mobile device relies on pseudorange measurements for the various satellites based on the predicted accuracies of those pseudorange measurements. Thus, the mobile device might calculate its own position in a manner such that pseudorange measurements that the mobile device predicts to be less accurate has less influence on the calculation than pseudorange measurements that the mobile device predicts to be more accurate.

In block 202, the mobile device determines a general area in which the mobile device is likely to be. For example, the mobile device can use WiFi signals from WiFi access points having known geographical coordinates, cellular telephone signals from terrestrial towers having known geographical coordinates, or other data not influenced by satellites, to compute an initial rough estimate of the area in which the mobile device is currently located. The mobile device could be anywhere within that area. The area may be of specified dimensions.

In block 204, the mobile device requests and receives, over one or more networks (including wireless networks), from a remote server, a digital 3D model of the area that the mobile device determined in block 202. For example, the area can be a circular area having a specified radius (e.g., 1 mile) that is centered around the approximate mobile device location estimated in block 202. For another example, the area can be a rectangular area. The mobile device can request the digital 3D model automatically or in response to a user request. According to one approach, the mobile device can request the digital 3D model periodically or in response to detecting that it is no longer located within the area represented by the last digital 3D model that the mobile device received from the remote server.

In block 206, the mobile device calculates pseudorange data for each satellite from which the mobile device can detect a signal. The mobile device might detect signals from multiple satellites concurrently. Each such signal may have a corresponding signal strength. In one embodiment, the mobile device can assign an initial uncertainty measurement to each satellite based at least in part on the signal strength of the signal that the mobile device received from that satellite. In one implementation, shadow matching can be performed in relation to buildings and satellites in order to determine whether certain signals cannot possibly be reflected.

According to one approach, the mobile device is configured to measure a specified quantity of sampling points. These sampling points can be spread across the surface of the digital 3D model of the area such that each point is maximally spaced from each other point within that area. Alternatively, the sampling points can be randomly selected points within the digital 3D model of the area. In block 208, for each sampling point within a set of multiple sampling points occurring within the general area that the mobile device determined in block 202, and for each satellite for which the mobile device calculated pseudorange data in block 206, the mobile device uses the digital 3D model that the mobile device received in block 204 to determine whether a direct ray traced from that satellite's estimated position to that sampling point is obstructed by an object represented in the digital 3D model.

For a given satellite, rays traced from that satellite's position to some sampling points might be obstructed, while rays traced from that satellite's position to some other sampling points might not be obstructed. The quantity of sampling points selected, and the positions of the sampling points chosen within the general area, can vary in different embodiments of the invention. For example, the sampling points within the area might be selected randomly, or in a manner that evenly spaces the sampling points over the area. A larger quantity of sampling points may increase the effectiveness of the technique described with reference to FIG. 2.

Alternatively, instead of tracing rays from each satellite's position to each sampling point, the digital 3D model can be used to construct an azimuth-and-elevation "mask." The mask resembles a silhouette of the urban skyline as seen from each sampling point. The azimuth and elevation of each known satellite can be compared against the mask to determine possible occlusion. In such an embodiment, the search space can be rapidly decimated into smaller quadrants so that only satellites within a particular quadrant are matched against buildings in that quadrant. During the check for occlusions, the satellites can be sorted in order from lowest elevation (higher chance of occlusion) to highest elevation (lower chance of occlusion). In one embodiment, prior knowledge of building elevation statistics can be used to determine which satellites and buildings to consider when determining potential occlusions. For example, in an area in which all buildings subtend elevation angles at a sampling position that are smaller than all possibly visible satellites, no satellite would be marked as being obstructed. The determination also can be based on statistics about the neighborhood in which the mobile device is estimated to be located. Such statistics can include, for example, the mean and standard deviation of building heights, widths, and lengths.

In block 210, for each satellite for which the mobile device calculated pseudorange data in block 206, the mobile device calculates an overall obstruction probability for that satellite based on the obstruction determinations that the mobile device generated for each of the sampling points in block 208. For example, a given satellite's obstruction probability can be a percentage or ratio that is calculated by dividing the quantity of obstructed sampling points for that satellite by the total quantity of sampling points. As is noted above, in one implementation, the sampling points can be equally spaced and spread over the surface of the area occupied by the digital 3D model. Thus, for example, if four of five sampling points for satellite 108 are obstructed, then mobile device 102 can calculate the obstruction probability for satellite 108 to be 80%. Continuing the example, if only one of five sampling points for satellite 110 are obstructed, then mobile device 102 can calculate the obstruction probability for satellite 110 to be only 20%.

Alternatively, instead of calculating a given satellite's obstruction probability as a percentage or ratio as discussed above, a weighted average can be generated in which the weights are obtained from a sampling of an uncertainty ellipse, such as the surface of the digital 3D model of the area mentioned above. If the sampling points at which evaluation is to occur are known, then each sampling point can be assigned a different weight based on its distance from the center of the ellipse. For example, there may be eight sampling points along a 2-sigma curve and one sampling point at the center of the ellipse. In an implementation, the approximate weights could be:

$$\frac{1}{16} * \begin{matrix} 1 & 1 & 1 \\ 1 & 8 & 1 \\ 1 & 1 & 1 \end{matrix}$$

where each weight in the matrix is multiplied by 1 in case of satellite visibility, and by zero in case of satellite invisibility at the sampling point corresponding to that weight. Notably, $$E(f(x)) = \frac{\int f(x)p(x)dx}{\int f(x)dx};$$

$$f(x) >= 0 \text{ for all } x$$

In one embodiment, the weight at the center of the ellipse can be estimated as 0.398942 and the weights surrounding the center can be estimated as 0.053991.

In block 212, for each satellite for which the mobile device calculated an obstruction probability in block 210, the mobile device adjusts or weights a uncertainty measurement for that satellite based on that satellite's obstruction probability. For example, the mobile device can multiply an initial uncertainty measurement for a given satellite by the obstruction probability for that satellite. Thus, if the initial uncertainty measurement for satellite 108 were 20% (e.g., based on the strength of the signal that mobile device 102 received from satellite 108), then mobile device 102 might adjust or weight the uncertainty measurement for satellite 108 by multiplying the initial uncertainty measurement of 20% by the obstruction probability (e.g., 0.8) for satellite 108, or 20%×0.8, producing a weighted uncertainty measurement of 16% for satellite 108. In an alternative embodiment, the mobile device can simply set each satellite's weighted uncertainty measurement to be equal to the obstruction probability that the mobile device calculated for that satellite.

In block 214, the mobile device modifies an influence value that each satellite's pseudorange measurement data has upon the mobile device's estimation of its own geographical location based on the weighted uncertainty measurement for that satellite that the mobile device determined in block 212. In various embodiments, the mobile device can use the weighted uncertainty measurements in different ways in order to influence the mobile device's estimation of its own geographical location. Various different techniques are described in further detail below.

Proportional Influence

As is discussed above in connection with the technique of FIG. 2, a mobile device can use a digital 3D model of the mobile device's environment to calculate a weighted uncertainty measurement for each satellite from which that mobile device detects a signal. In one embodiment of the invention, the mobile device uses multiplication to adjust the influence that each satellite's pseudorange data has upon the mobile device's determination of its own geographical coordinates. For example, if the weighted uncertainty measurement for satellite 108 is 16%, and if the weighted uncertainty measurement for satellite 110 is 3%, then the mobile device can adjust the influence of the pseudorange data from satellite 108 on the mobile device's geographical coordinate determination by 100%–16%, or 84%, and the mobile device can adjust the influence of the pseudorange data from satellite 110 on the mobile device's geographical coordinate determination by 100%–3%, or 97%. In such an example, the mobile device would rely more on the pseudorange data from satellite 108 than the pseudorange data from satellite 110 when determining its own geographical coordinates. However, in alternative embodiments, the mobile device can use the weighted uncertainty measurements in other ways, some of which are discussed below.

Eliminating Anomalies

Figure 3:
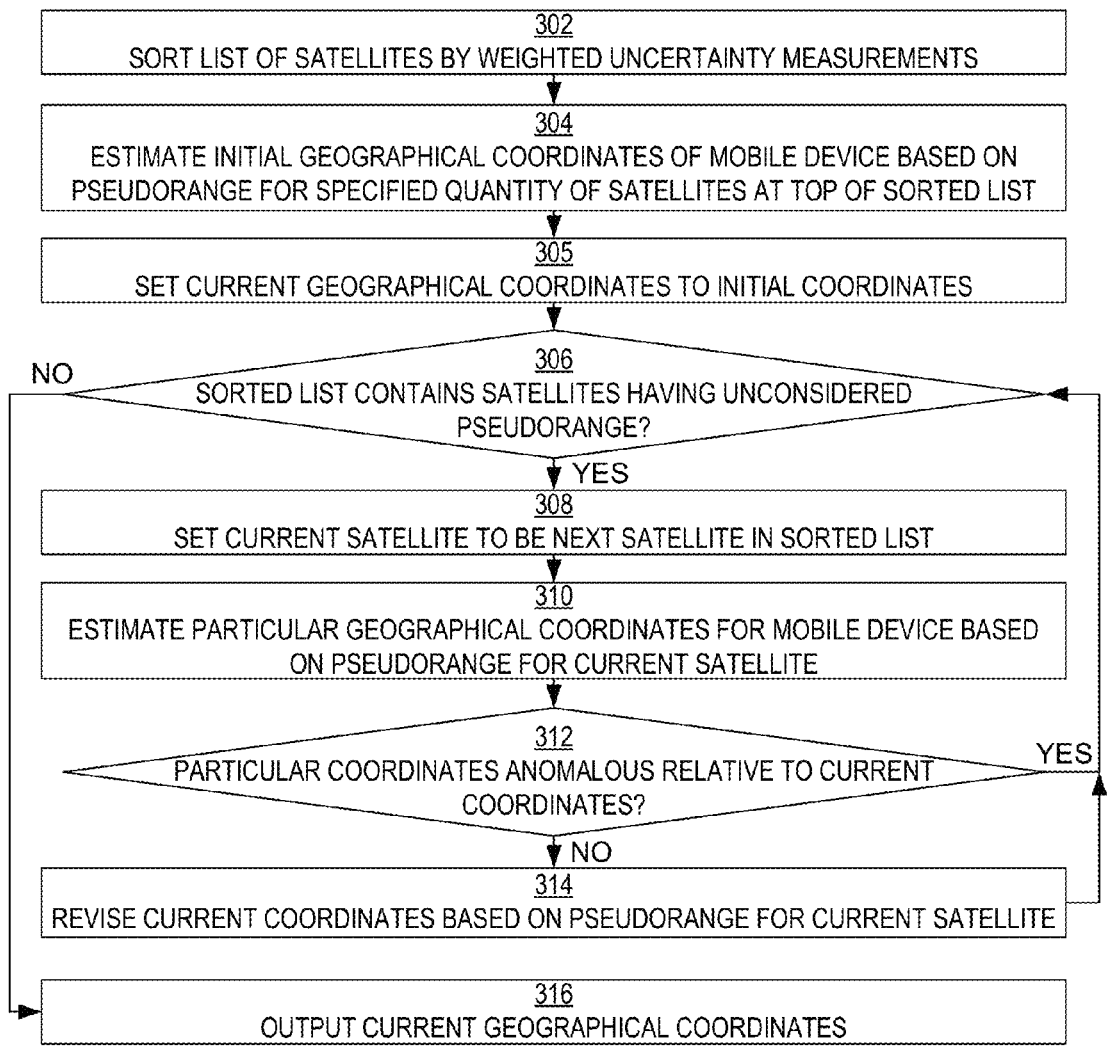
FIG. 3 is a flow diagram that illustrates an example of a technique for eliminating the influence of anomalous pseudorange data from a mobile device's calculation of its own geographical coordinates, according to an embodiment of the invention.

In one alternative embodiment of the invention, the mobile device does not use, at all, in its estimation of its own geographical coordinates, pseudorange data that leads to a positional estimate that is wildly different from positional estimates produced by the use of pseudorange data with relatively low weighted uncertainty measurements. Instead, in such an embodiment, the mobile device completely excludes such anomalous data in its estimation of its own geographical coordinates. FIG. 3 is a flow diagram that illustrates an example of a technique for eliminating the influence of anomalous pseudorange data from a mobile device's calculation of its own geographical coordinates, according to an embodiment of the invention. In block 302, the mobile device sorts a list of satellites for which it has weighted uncertainty measurements (e.g., determined using the technique discussed above in connection with FIG. 2) by those weighted uncertainty measurements. Through such sorting, satellites having relatively lower weighted uncertainty measurements can be ranked closer to the top of the list than satellites having relatively higher weighted uncertainty measurements. Thus, pseudorange data for the satellites toward the top of the sorted list is more reliable than pseudorange data for the satellites toward the bottom of the sorted list.

In block 304, the mobile device initially estimates its geographical coordinates based on pseudorange data from a specified quantity of satellites at the top of the sorted list. For example, if the specified quantity is three, then the mobile device can initially estimate its geographical coordinates based on pseudorange data from the top three satellites in the sorted list. One possible way in which the mobile device might use pseudorange data from multiple satellites in this way is by calculating separate geographical coordinates based on each satellite's pseudorange data, calculating a master X coordinate by averaging all of the resulting X coordinates, and calculating a master Y coordinate by averaging all of the resulting Y coordinates. In block 305, the mobile device sets current geographical coordinates to be the geographical coordinates (e.g., the master X and Y coordinates) estimated in block 306.

In block 306, the mobile device determines whether the sorted list contains any further satellites for which pseudorange data has not yet been considered. If so, then control passes to block 308. Otherwise, control passes to block 316.

In block 308, the mobile device sets a current satellite to be the next satellite for which pseudorange data has not yet been considered in the sorted list. In block 310, the mobile device estimates particular geographical coordinates for itself based on the pseudorange data for the current satellite. In block 312, the mobile device determines whether the particular geographical coordinates are anomalous in view of the current geographical coordinates. There are various ways in which the mobile device might do this. One way in which the mobile device can do this is by determining whether the particular geographical coordinates are more than a specified threshold distance away from the current geographical coordinates, and/or whether the particular geographical coordinates are more than a specified threshold distance away from any of the geographical coordinates previously calculated from any other satellite's pseudorange data. The specified threshold distance might be absolute, or might be statistically determined, for example. The specified threshold distance might be based on the distances between the geographical coordinates previously calculated from the other satellites' pseudorange data. The mobile device can use a clustering algorithm to determine whether the particular geographical coordinates would fall within a cluster of geographical coordinates previously calculated from the other satellites' pseudorange data. Essentially, if the particular geographical coordinates are anomalous (e.g., statistically) relative to the geographical coordinates calculated based on the pseudorange data for satellites having lower weighted uncertainty measurements (and thus occurring higher in the sorted list), then the mobile device can determine that the particular geographical coordinates ought not to be used in the mobile device's calculation of its own location; under such circumstances, the weighted uncertainty measurement from the corresponding satellite is too high to be useful. If the mobile device determines that the particular geographical coordinates are anomalous, then mobile device essentially ignores the pseudorange data from the corresponding satellite, and control passes to block 306. Otherwise, control passes to block 314.

In block 314, the mobile device revises the current geographical coordinates based on pseudorange data from the current satellite. One possible way in which the mobile device might perform this revision is by adding the X and Y coordinates from the particular geographical coordinates (determined in block 310) to the sets of X and Y coordinates used to calculate the master X and Y coordinates through averaging, as discussed above in connection with block 304. Control passes back to block 306.

Alternatively, in block 316, the mobile device outputs the current geographical coordinates. For example, the mobile device can plot, on a map of the mobile device's environment that the mobile device displays to its user, a point at which the current geographical coordinates occur on that map. The technique of FIG. 3 then concludes.

In an embodiment of the invention described above, the mobile device can entirely ignore pseudorange data that produces location estimates that are anomalous relative to location estimates produced based on pseudorange data from satellites having lower weighted uncertainty measurements. However, in an alternative embodiment of the invention, instead of ignoring such anomalous pseudorange data entirely, the mobile device can reduce (e.g., by some specified value or by some value that varies depending on the corresponding satellite's list rank or weighted uncertainty measurement) the influence that such anomalous pseudorange data has upon the mobile device's current location calculation, without reducing such influence to none at all.

Matching Fingerprints

In one alternative embodiment of the invention, a mobile device can generate an "actual fingerprint" based on the strengths of signals that the mobile device detects from each satellite in a group of satellites. Each such satellite can have a corresponding signal strength in the actual fingerprint. Then, for each sampling point in a set of sampling points, potentially selected in a manner similar to that discussed above for selecting sampling points, the mobile device can use the digital 3D model and obstruction probabilities ascertained therefrom in order to generate separate "predicted fingerprint" for that sampling point. A predicted fingerprint for a particular sampling point can indicate, for each satellite in the group of satellites, whether a ray traced directly from that satellite to that particular sampling point will be obstructed by some object represented in the digital 3D model. After generating the predicted fingerprints for the various sampling points, the mobile device can compare the actual fingerprint to each of the predicted fingerprints to determine which of the predicted fingerprints most closely approximates the actual fingerprint. For example, if the set of satellites from which the mobile device detects relatively strong signals (as indicated in the actual fingerprint) closely matches the set of satellites from which rays are not obstructed at a particular sampling point (as indicated in that particular sampling point's predicted fingerprint) and if the set of satellites from which the mobile device detects relatively weak (or no) signals (as indicated in the actual fingerprint) closely matches the set of satellites from which rays are obstructed at that particular sampling point (as indicated in that particular sampling point's predicted fingerprint), then that particular sampling point is a good candidate for representing the mobile device's actual location accurately. In one embodiment, the mobile device can present its current geographical location as being the geographical coordinates of the sampling point having the predicted fingerprint most closely matching the mobile device's actual fingerprint.

Figure 4:
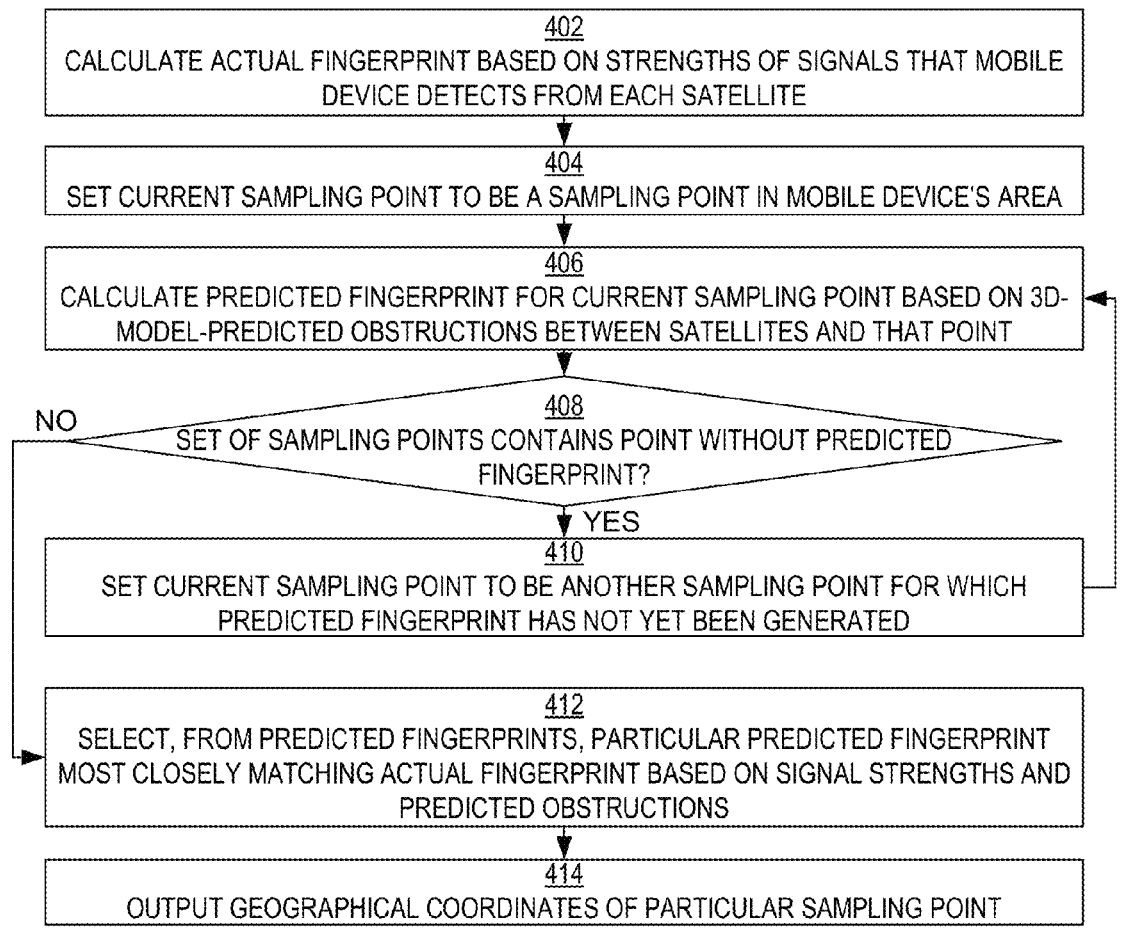
FIG. 4 is a flow diagram that illustrates an example of a technique for estimating a mobile device's current geographical location based on the closeness of similarities between an actual fingerprint and predicted fingerprints for various sampling points, according to an embodiment of the invention.

FIG. 4 is a flow diagram that illustrates an example of a technique for estimating a mobile device's current geographical location based on the closeness of similarities between an actual fingerprint and predicted fingerprints for various sampling points, according to an embodiment of the invention. In block 402, the mobile device calculates an actual fingerprint based on the strengths of signals that the mobile device detects from each satellite in a group of satellites. In the event that the mobile device cannot detect any signal from a particular known satellite, the strength of the signal for that particular satellite may effectively be zero. Thus, the actual fingerprint may be a list of known satellites and their detected signal strengths.

In block 404, the mobile device sets the current sampling point to be one of the sampling points in a set of sampling points in the area in which the mobile device is estimated (e.g., using WiFi, cellular telephone signals, etc.) to be. As is discussed above, the mobile device can request and receive a digital 3D model of the area from a remote server over one or more networks.

In block 406, the mobile device calculates a predicted fingerprint for the current sampling point based on determinations of whether rays from each satellite in the group of satellites are obstructed by objects (e.g., buildings) represented in the digital 3D model of the area. In block 408, the mobile device determines whether the set of sampling points contains any sampling point for which a predicted fingerprint has not yet been generated. If so, then control passes to block 410. Otherwise, control passes to block 412.

In block 410, the mobile device sets the current sampling point to be a sampling point, for which a predicted fingerprint has not yet been generated, in the set of sampling points. Control passes back to block 406.

Alternatively, in block 412, the mobile device selects, from the various predicted fingerprints, a particular predicted fingerprint that most closely matches the actual fingerprint based on signal strengths and predicted obstructions for each of the satellites in the group of satellites. One possible way of performing the matching is described above. In block 414, the mobile device outputs the geographical coordinates of the particular sampling point for which the particular predicted fingerprint (selected in block 410) was calculated (in block 406). For example, the mobile device can plot, on a map of the mobile device's environment that the mobile device displays to its user, a point at which the geographical coordinates of the particular sampling point occur on that map. The technique of FIG. 4 then concludes.

Constraining a Solution Set

A mobile device can use a digital 3D model of its environment in a multitude of ways to help determine its current geographical location. Some of these ways are discussed above. In one embodiment, a mobile device also can use a digital 3D model of its environment in order to constrain a possible set of coordinates at which the mobile device might currently be located. In one embodiment, the mobile device can use a variety of techniques, such as the techniques discussed above or other techniques, to determine a set of possible locations at which the mobile device might currently be located. Some of these possible locations might be associated with more certainty than others. In any case, in one embodiment of the invention, the mobile device can determine, for each of these possible locations, whether those locations are contained inside of a building or other object that is represented within the digital 3D model. Assuming that the mobile device would not be able to receive any signal of significant strength from any satellite while the mobile device is inside of a building, in one embodiment, the mobile device eliminates, from the set of possible locations, all locations that are contained inside of a building or other object that is represented within the digital 3D model. The mobile device can then use the remaining possible locations to determine, or select from the remaining possible locations, a location that is most likely to represent the mobile device's actual geographical coordinates accurately.

Hardware Overview

Figure 5A:
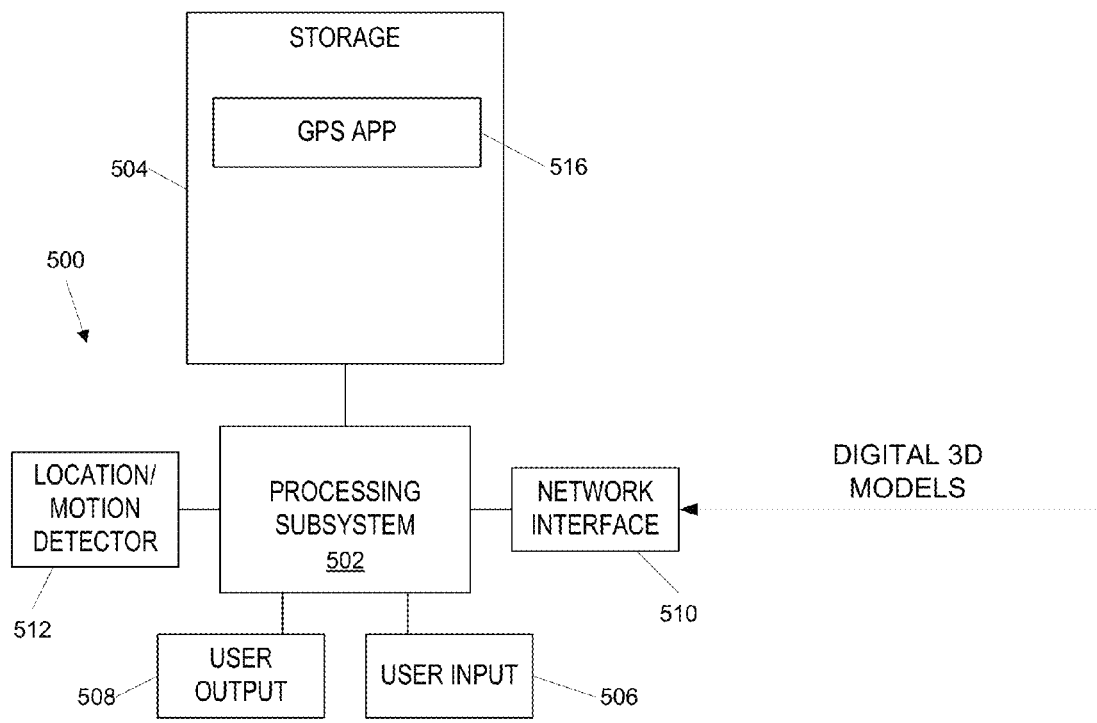
FIG. 5A is a simplified block diagram of an implementation of a device according to an embodiment of the present invention.

FIG. 5A is a simplified block diagram of an implementation of a device 500 according to an embodiment of the present invention. Device 500 can be a mobile device, a handheld device, a notebook computer, a desktop computer, or any suitable electronic device with a screen for displaying images and that is capable of communicating with a digital 3D model server 550 as described herein. Device 500 includes a processing subsystem 502, a storage subsystem 504, a user input device 506, a user output device 508, a network interface 510, and a location/motion detector 512.

Processing subsystem 502, which can be implemented as one or more integrated circuits (e.g., e.g., one or more single-core or multi-core microprocessors or microcontrollers), can control the operation of device 500. In various embodiments, processing subsystem 502 can execute a variety of programs in response to program code and can maintain multiple concurrently executing programs or processes. At any given time, some or all of the program code to be executed can be resident in processing subsystem 502 and/or in storage subsystem 504.

Through suitable programming, processing subsystem 502 can provide various functionality for device 500. For example, processing subsystem 502 can execute a GPS application program (or "app") 516. GPS app 516 can estimate a position of device 500 based on strengths of signals detected from various satellites and based on line-of-sight obstructions predicted based on a digital 3D model. GPS app 516 can perform various embodiments described herein.

Storage subsystem 504 can be implemented, e.g., using disk, flash memory, or any other storage media in any combination, and can include volatile and/or non-volatile storage as desired. In some embodiments, storage subsystem 504 can store one or more application programs to be executed by processing subsystem 502 (e.g., GPS app 516). In some embodiments, storage subsystem 504 can store other data (e.g., used by and/or defined by GPS app 516). Programs and/or data can be stored in non-volatile storage and copied in whole or in part to volatile working memory during program execution.

A user interface can be provided by one or more user input devices 506 and one or more user output devices 508. User input devices 506 can include a touch pad, touch screen, scroll wheel, click wheel, dial, button, switch, keypad, microphone, or the like. User output devices 508 can include a video screen, indicator lights, speakers, headphone jacks, or the like, together with supporting electronics (e.g., digital-to-analog or analog-to-digital converters, signal processors, or the like). A customer can operate input devices 506 to invoke the functionality of device 500 and can view and/or hear output from device 500 via output devices 508.

Network interface 510 can provide voice and/or data communication capability for device 500. For example, network interface 510 can provide device 500 with the capability of communicating with digital 3D model server 550. In some embodiments network interface 510 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 510 can provide wired network connectivity (e.g., Ethernet) in addition to or instead of a wireless interface. Network interface 510 can be implemented using a combination of hardware (e.g., antennas, modulators/demodulators, encoders/decoders, and other analog and/or digital signal processing circuits) and software components.

Location/motion detector 512 can detect a past, current or future location of device 500 and/or a past, current or future motion of device 500. For example, location/motion detector 512 can detect a velocity or acceleration of mobile electronic device 500. Location/motion detector 512 can comprise a Global Positioning Satellite (GPS) receiver and/or an accelerometer. In some instances, processing subsystem 502 determines a motion characteristic of device 500 (e.g., velocity) based on data collected by location/motion detector 512. For example, a velocity can be estimated by determining a distance between two detected locations and dividing the distance by a time difference between the detections.

Figure 5B:
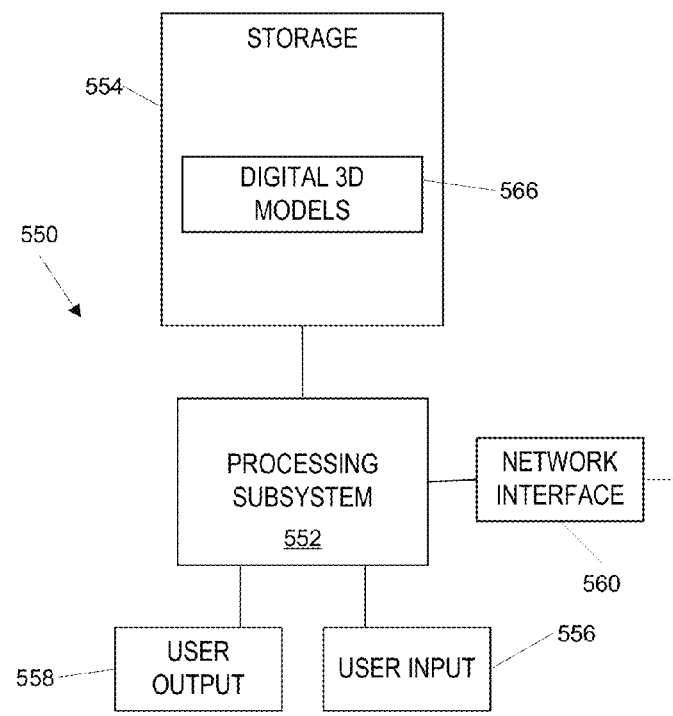
FIG. 5B is a simplified block diagram of an implementation of a digital 3D model server according to an embodiment of the present invention.

FIG. 5B is a simplified block diagram of an implementation of a digital 3D model server 550 according to an embodiment of the present invention. Digital 3D model server 550 may be used for any remote server mentioned herein. Digital 3D model server 550 includes a processing subsystem 552, storage subsystem 554, a user input device 556, a user output device 558, and a network interface 560. Network interface 560 can have similar or identical features as network interface 510 of device 500 described above.

Processing subsystem 552, which can be implemented as one or more integrated circuits (e.g., a conventional microprocessor or microcontroller), can control the operation of digital 3D model server 550. In various embodiments, processing subsystem 552 can execute a variety of programs in response to program code and can maintain multiple concurrently executing programs or processes. At any given time, some or all of the program code to be executed can be resident in processing subsystem 552 and/or in storage subsystem 554.

Through suitable programming, processing subsystem 552 can provide various functionality for digital 3D model server 550. Thus, digital 3D model server 550 can interact with GPS app 516 being executed on device 500 in order to provide a digital 3D model of a specified area device 500. In one embodiment, digital 3D model server 550 simply stores digital 3D models for various areas, and sends them based on a request for a particular area.

Storage subsystem 554 can be implemented, e.g., using disk, flash memory, or any other storage media in any combination, and can include volatile and/or non-volatile storage as desired. In some embodiments, storage subsystem 554 can store one or more application programs to be executed by processing subsystem 552. In some embodiments, storage subsystem 554 can store other data, such as digital 3D models 566. Programs and/or data can be stored in non-volatile storage and copied in whole or in part to volatile working memory during program execution.

A user interface can be provided by one or more user input devices 556 and one or more user output devices 558. User input and output devices 556 and 558 can be similar or identical to user input and output devices 506 and 508 of device 500 described above. In some instances, user input and output devices 556 and 558 are configured to allow a programmer to interact with digital 3D model server 550. In some instances, digital 3D model server 550 can be implemented at a server farm, and the user interface need not be local to the servers.

It will be appreciated that device 500 and digital 3D model server 550 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 500 and/or multiple digital 3D model servers 550, different devices 500 and/or digital 3D model servers 550 can have different sets of capabilities; the various devices 500 and/or digital 3D model servers 550 can be but need not be similar or identical to each other.

Further, while device 500 and digital 3D model server 550 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 500 and digital 3D model server 550 are described as singular entities, it is to be understood that each can include multiple coupled entities. For example, digital 3D model server 550 can include, a server, a set of coupled servers, a computer and/or a set of coupled computers.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components.

The subsystems can be interconnected via a system bus. Additional subsystems can be a printer, keyboard, fixed disk, monitor, which can be coupled to display adapter. Peripherals and input/output (I/O) devices, which couple to an I/O controller, can be connected to the computer system by any number of means known in the art, such as serial port. For example, serial port or external interface (e.g. Ethernet, Wi-Fi, etc.) can be used to connect computer system to a wide area network such as the Internet, a mouse input device, or a scanner. The interconnection via the system bus can allow the central processor to communicate with each subsystem and to control the execution of instructions from system memory or the fixed disk, as well as the exchange of information between subsystems. The system memory and/or the fixed disk may embody a computer readable medium. Any of the values mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A computer-implemented method comprising:
for each particular satellite of a plurality of satellites, performing, at a mobile device, particular operations comprising:
estimating, based on a digital three-dimensional (3D) model of an environment in which the mobile device is contained, a probability that a ray extending from that particular satellite to the mobile device is obstructed by an object represented in the digital 3D model and occurring in the environment, wherein the digital 3D model of the environment is provided based on a global positioning system on the mobile device, and weighting an uncertainty of location data provided to the mobile device by the particular satellite based on the probability estimated for that particular satellite; and adjusting an extent of influence that the location data provided by each satellite of the plurality of satellites has upon a determination of a position of the mobile device based at least in part on the weighted uncertainty for each satellite of the plurality of satellites.

2. The computer-implemented method of claim 1, further comprising:

ranking the plurality of satellites based at least in part on the probabilities estimated for the satellites;

detecting an anomaly; and eliminating an influence of a particular location data upon the determination of the position of the mobile device in response to detecting the anomaly.

3. The computer-implemented method of claim 2, wherein detecting the anomaly comprises:

generating a set of possible positions of the mobile device based on location data from each of one or more satellites that are more highly ranked than the particular satellite;

excluding, from the set of possible positions, positions based on location data whose influence upon the determination of the position of the mobile device was eliminated for being anomalous;

generating a cluster containing positions from the set of possible positions on which the excluding has been performed; and determining that a possible position generated based on the particular location data falls outside of the cluster.

4. The computer-implemented method of claim 2, wherein detecting the anomaly comprises:

generating a set of possible positions of the mobile device based on location data from each of one or more satellites that are more highly ranked than the particular satellite;

excluding, from the set of possible positions, positions based on location data whose influence upon the determination of the position of the mobile device was eliminated for being anomalous; and determining, for each remaining position in the set on which the excluding has been performed, a distance between that remaining position and a particular position generated based on the particular location data; and determining that distances between the particular position and each remaining position in the set exceed a maximum distance between any remaining positions in the set.

5. The method according to claim 2, wherein the anomaly is detected between (a) location data from one or more satellites that are more highly ranked than another particular satellite and (b) particular location data from the other particular satellite.

6. The computer-implemented method of claim 1, further comprising:

ranking the plurality of satellites based at least in part on the probabilities estimated for the satellites;

determining that a particular position determined based on location data from a particular satellite is within a specified range of a set of other positions determined based on location data from satellite that are more highly ranked than the particular satellite;

including the particular position in the set of other positions; and using the set of other positions including the particular position to detect anomalies in positions determined based on location data from satellites that are ranked lower than the particular satellite.

7. The computer-implemented method of claim 1, further comprising:

determining the environment at the mobile device using information obtained from a source not within the plurality of satellites;

requesting the digital 3D model of the environment from a server over one or more networks; and receiving the digital 3D model of the environment at the mobile device.

8. The computer-implemented method of claim 1, further comprising:

eliminating, from a set of possible positions of the mobile device that were determined based on data from the plurality of satellites, positions that are located inside of objects represented within the digital 3D model.

9. A computer-implemented method comprising:

generating, at a mobile device, an actual fingerprint based at least in part on strengths of signals that the mobile device receives from each satellite of a plurality of satellites;

for each sampling point of a plurality of sampling points within a specified area in which the mobile device is estimated to be, performing, at the mobile device, particular operations comprising:

determining, based on a digital three-dimensional (3D) model of the specified area, probabilities that rays extending from satellites in the plurality of satellites to the sampling point are obstructed by objects represented in the digital 3D model and occurring in the specified area, wherein the digital 3D model of an environment is provided based on a global positioning system on the mobile device, and generating an estimated fingerprint for the sampling point based at least in part on the determined probabilities; and estimating an actual global position for the mobile device based at least in part on extents to which estimated fingerprints generated for the sampling points are consistent with the actual fingerprint.

10. The computer-implemented method of claim 9, wherein the estimating comprises:

for each particular satellite of the plurality of satellites, determining whether a strength of a signal from that particular satellite represented in the actual fingerprint is consistent with an existence or lack of a model-estimated obstruction of a ray originating from that particular satellite represented in a particular estimated fingerprint of a plurality of different estimated fingerprints for different sampling points of the plurality of sampling points.

11. The computer-implemented method of claim 10, wherein determining whether the strength of the signal is consistent with the existence or lack of the model-estimated obstruction comprises:

determining whether a lack of a model-estimated obstruction occurs when the strength exceeds a specified threshold.

12. The computer-implemented method of claim 10, wherein determining whether the strength of the signal is consistent with the existence or lack of the model-estimated obstruction comprises:

determining whether existence of a model-estimated obstruction occurs when the strength does not exceed a specified threshold.

13. A non-transitory computer-readable storage medium storing instructions which, when executed by one or more processors, cause the one or more processors to:
    estimate, for each particular satellite of a plurality of satellites, and based on a digital three-dimensional (3D) model of an environment in which a mobile device is contained, a probability that a ray extending from that particular satellite to the mobile device is obstructed by an object represented in the digital 3D model, wherein the digital 3D model of the environment is provided based on a global positioning system on the mobile device;
    weight an uncertainty of location data provided to the mobile device by the particular satellite based on the probability estimated for that particular satellite; and
    adjust an extent of influence that the location data provided by each satellite of the plurality of satellites has upon a determination of a position of the mobile device based at least in part on the weighted uncertainty for each satellite of the plurality of satellites.

14. The non-transitory computer-readable storage medium of claim 13, wherein the instructions, when executed by the one or more processors, cause the one or more processors to:
    rank the plurality of satellites based at least in part on the probabilities estimated for the satellites;
    detect an anomaly; and
    eliminate an influence of a particular location data upon the determination of the position of the mobile device in response to detecting the anomaly.

15. The non-transitory computer-readable storage medium of claim 14, wherein the instructions, when executed by the one or more processors, cause the one or more processors to:
    generate a set of possible positions of the mobile device based on location data from each of one or more satellites that are more highly ranked than the particular satellite;
    exclude, from the set of possible positions, positions based on location data whose influence upon the determination of the position of the mobile device was eliminated for being anomalous;
    generate a cluster containing positions from the set of possible positions on which the excluding has been performed; and
    determine that a possible position generated based on the particular location data falls outside of the cluster.

16. The non-transitory computer-readable storage medium of claim 14, wherein the instructions, when executed by the one or more processors, cause the one or more processors to:
    generate a set of possible positions of the mobile device based on location data from each of one or more satellites that are more highly ranked than the particular satellite;
    exclude, from the set of possible positions, positions based on location data whose influence upon the determination of the position of the mobile device was eliminated for being anomalous; and
    determine, for each remaining position in the set on which the excluding has been performed, a distance between that remaining position and a particular position generated based on the particular location data; and
    determine that distances between the particular position and each remaining position in the set exceed a maximum distance between any remaining positions in the set.

17. The non-transitory computer-readable storage medium of claim 13, wherein the instructions, when executed by the one or more processors, cause the one or more processors to:
    rank the plurality of satellites based at least in part on the probabilities estimated for the satellites;
    determine that a particular position determined based on location data from a particular satellite is within a specified range of a set of other positions determined based on location data from satellite that are more highly ranked than the particular satellite;
    include the particular position in the set of other positions; and
    use the set of other positions including the particular position to detect anomalies in positions determined based on location data from satellites that are ranked lower than the particular satellite.

18. The non-transitory computer-readable storage medium of claim 13, wherein the instructions, when executed by the one or more processors, cause the one or more processors to:
    determine the environment at the mobile device using information obtained from a source not within the plurality of satellites;
    request the digital 3D model of the environment from a server over one or more networks; and
    receive the digital 3D model of the environment at the mobile device.

19. The non-transitory computer-readable storage medium of claim 13, wherein the instructions, when executed by the one or more processors, cause the one or more processors to:
    eliminate, from a set of possible positions of the mobile device that were determined based on data from the plurality of satellites, positions that are located inside of objects represented within the digital 3D model.

20. The non-transitory computer-readable storage medium of claim 13, wherein the instructions, when executed by the one or more processors, cause the one or more processors to:
    generate an actual fingerprint that indicates, for each particular satellite of the plurality of satellites, whether the mobile device currently detects a signal from that particular satellite;
    generate a first estimated fingerprint indicating, for each particular satellite of the plurality of satellites, whether the digital 3D model estimates that a ray traced from that particular satellite to a first sampling point in the environment will be obstructed by an object represented in the digital 3D model; and
    generate a second estimated fingerprint indicating, for each particular satellite of the plurality of satellites, whether the digital 3D model estimates that a ray traced from that particular satellite to a second sampling point in the environment will be obstructed by an object represented in the digital 3D model.

21. The non-transitory computer-readable storage medium of claim 20, wherein the instructions, when executed by the one or more processors, cause the one or more processors to:
    select, from an estimated fingerprint set including the first estimated fingerprint and the second estimated fingerprint, one or more particular estimated fingerprints that most closely match the actual fingerprint among estimated fingerprints in the set; and output geographical location data generated based on one or more positions representative of one or more sampling points for which the one or more particular estimated fingerprints were generated.

\* \* \* \* \*